United States Patent
Creamer et al.

(10) Patent No.: US 6,421,424 B1
(45) Date of Patent: Jul. 16, 2002

(54) CLIENT SIMULATOR AND METHOD OF OPERATION FOR TESTING PSTN-TO-IP NETWORK TELEPHONE SERVICES FOR INDIVIDUAL & GROUP INTERNET CLIENTS PRIOR TO AVAILABILITY OF THE SERVICES

(75) Inventors: Thomas E. Creamer; Shailesh Gandhi; Peeyush Jaiswal, all of Boca Raton, FL (US)

(73) Assignee: International Business Machines Corp., Armonk, NY (US)

( * ) Notice: Subject to any disclaimer, the term of this patent is extended or adjusted under 35 U.S.C. 154(b) by 73 days.

(21) Appl. No.: 09/587,322

(22) Filed: Jun. 5, 2000

(51) Int. Cl.$^7$ ................................................ H04M 1/24
(52) U.S. Cl. ...................... 379/15.01; 379/1.01; 379/9; 379/10.03
(58) Field of Search ............................ 379/9, 17, 32.01, 379/1.01, 10.03, 11, 15.01, 15.04, 18; 714/33, 46; 709/203

(56) References Cited

U.S. PATENT DOCUMENTS

| | | | |
|---|---|---|---|
| 3,952,172 A | | 4/1976 | Penn et al. |
| 4,238,649 A | | 12/1980 | Kemler |
| 5,065,422 A | | 11/1991 | Ishikawa |
| 5,627,834 A | | 5/1997 | Han et al. |
| 5,761,272 A | * | 6/1998 | Williams et al. |
| 6,016,334 A | * | 1/2000 | Kasrai |
| 6,324,492 B1 | * | 11/2001 | Rowe |

\* cited by examiner

*Primary Examiner*—Huyen Le
*Assistant Examiner*—Barry W Taylor
(74) *Attorney, Agent, or Firm*—Joseph C. Redmond, Jr.; Morgan & Finnegan, LLP

(57) ABSTRACT

A client simulator for simulating client behavior in groups or individuals to telephone services in a test system for testing telephone services between subscribers in a PSTN and clients in a distributed information network, for example, the Internet (IP Network), prior to availability of the telephone services to the subscribers and clients. A processor is coupled to a TCP/IP data network linked to the PSTN via a System Control Point (SCP) and the IP Network via an application server. A storage means is coupled to the processor through input/output registers and includes stored instruction for a parent process and a pool of client processes. e storage means further includes: a) a test input data file which contains client behavior profiles of either groups or individual client processes to call data messages; b) a logger queue file which allows the parent process to write event messages indicating start or stopped client processes with time stamp; c) a client information file which contains information and data for the total number of processes identified as being part of the test; d) a stopped client file used to track client processes that have stopped. The parent process is responsible for reading the test input data file and passing the client process behavior profile to the client processes. Each client process is responsible for returning state information to the PSTN; call handling actions and providing call handling statistics. The client process includes a client behavior control functions which processes and maintains the behavior parameters passed by the parent process. The behavior function, inter alia, accepts the call message, forward the call message according to the client behavior profile. The client process further includes a send/receive function to read and write to the registers coupled to the TCP/IP data network and support voice over IP protocols. A test originated by the PSTN is passed to the test input data file by the SCP and application file. The parent processes passes the call message to the client process. The client process provides a variety of call handling options including (a) accepting the call on the client's PC; sending a voice message to the caller. The call data messages responses are sent back to the SCP through the application server. The SCP directs the PSTN on how to handle the message call response.

24 Claims, 7 Drawing Sheets

CLIENT SIMULATOR AND METHOD OF OPERATION FOR TESTING PSTN-TO-IP NETWORK TELEPHONE SERVICES FOR INDIVIDUAL & GROUP INTERNET CLIENTS PRIOR TO AVAILABILITY OF THE SERVICES

RELATED APPLICATION

Ser. No. 09/468,929, entitled "System & Method of Operation for Verifying and Validating Public Switch Telephone Networks (PSTN) to (IP) Network Services", filed Dec. 22, 1999 (BC9-99-027/1963–7322), assigned to the same assignee as that of the present invention and fully incorporated herein by reference.

BACKGROUND OF THE INVENTION

1. Field of the Invention

This invention relates to call simulators for PSTN-IP network telephone services and methods of operation. More particularly, the invention relates to a client's simulator and method of operation in testing PSTN to IP network telephone services for individual and group internet clients prior to availability of the telephone services.

2. Description of Prior Art

The introduction of PSTN-IP network based telephone services, e.g., call waiting, call forwarding, call back, etc., requires PSTN or IP network service providers to verify and validate these new services before on-line operations commence. The verification and validity involves generating hundreds of telephone calls per second and simulating thousands of IP network clients as individuals or group internet clients. What is needed to verify or validate a service is a call simulator, which simulates client behavior in groups or individuals to the telephone system in a test system for testing telephone services prior to the availability of the telephone services to the subscribers and clients.

Prior art related to client simulators for testing telephone services includes the following:

U.S. Pat. No. 3,952,172 entitled "Telephone Call simulator", issued Apr. 20, 1976, discloses a telephone simulator, which includes a plurality of pseudo-subscriber circuits connected to subscriber lines. A plurality of pseudo junctures are connected to trunk lines. A number of detector circuits respond to line conditions, tones, circuit operations, data processing, and the like. A data processor uses this equipment to check incoming and outgoing calls to and from a public telephone network.

U.S. Pat. No. 4,238,649 entitled "Call Simulator", issued Dec. 9, 1980, discloses a traffic simulator for simulating calls switched through a tandem exchange by simulating both the calling and the answering exchange sides of signaling with the tandem exchange, and in which the progress of the call is split into a succession of phases during which a connection is set up through the tandem exchange, speech between subscribers is simulated, and the connection is cleared. A simulator comprises two independent modules, a calling side module connected to an incoming circuit terminating equipment of the exchange to simulate signaling between a calling exchange and the tandem exchange by its incoming circuit connected to the incoming terminating equipment and answering side module connected to an outgoing circuit terminating equipment of the exchange to simulate signaling between the tandem exchange and an answering exchange.

U.S. Pat. No. 5,065,422 entitled "Subscriber Call Simulator Capable of Testing New Services of a Telephone Switching System", issued Nov. 12, 1991, discloses a subscriber call simulator connected to a telephone switching system through subscriber lines and acting as a plurality of pseudo-subscriber telephone sets. An input/output section, inputs control procedure information for the pseudo-subscriber's telephone sets. Connected to the input/output section is a memorizing arrangement, which memorizes the control procedure information as stored information. By using the stored information, a control circuit controls the pseudo-subscriber's telephone sets. The control procedure information comprises a control procedure program and correspondence information stored in a procedure program memory in a correspondence information memory, respectively, both of which act as the memorizing arrangement for automatically testing various new telephone services.

None of the prior art discloses a PSTN-IP network based client simulator for simulating individual and group internet clients for PSTN-IP network telephone services prior to the availability of the telephone services.

SUMMARY OF THE INVENTION

An object of the invention is a call simulator and method of operation for use in testing PSTN to IP network telephone services.

Another object is a call simulator and method of operation simulating thousands of IP network clients doing testing of PSTN-IP telephone services.

Another object is a call simulator and method of operation providing a mix of predictable client responses during testing of PSTN-IP telephone services.

Another object is a call simulator and method of operation, which provides separate and distinct, simulated client actions during testing of PSTN-IP telephone services.

These and other objects, features and advantages are achieved in a client simulator including a processor coupled to a TCP/IP data network linked to a PSTN via a System Control Point (SCP) and to an IP network via an application server. A storage means is coupled to the processor through input/output registers and includes stored instructions for a parent process in a plurality of client processes in a client pool. The parent process is responsible for reading a test input data file and passing the client process behavior profile to the client process. Each client process is responsible for returning state information to the PSTN; call handling actions and providing call handling statistics. The client process includes a client behavior control function, which processes and maintains behavior parameters passed by the client parent process. The behavior function, inter alia, accepts the call message; forwards the call message according to the client behavior profile. The client process further includes a send/receive function to read and write to the registers coupled to the TCP/IP data network and support voice over IP protocols. A test originated by the PSTN is passed by the SCP and application file to the client simulator. A parent processes in the simulator reads a test input data file and passes the call message to the client process. The client process provides a variety of call handling options including (a) accepting the call when a client's PC forwarding the call to another number; sending a voice message to the caller. The call data message responses are sent back to the SCP through the application server. The SCP directs the PSTN on how to handle the message call response.

DESCRIPTION OF THE DRAWING

The invention will be further understood from the following detailed description of a preferred embodiment taken in conjunction with an appended drawing, in which.

DESCRIPTION OF PREFERRED EMBODIMENT

Within the process of developing a new telephone service for a communication system, for example, Public Switch Telephone Network (PSTN)-Internet Protocol (IP) interconnection, there is a need for a developer to simulate and verify the service and obtain client behavior definition in the system before introduction of the telephone service. The test system is spread across many components and the system is tested if the telephone service was active. The test results enable the system developers to modify the communications system to provide the service with some assurance of acceptable performance. In the present instance, the test system will be described with respect to an Internet Call Waiting (ICW) service. However, it should understood that other services, e.g., Call Waiting, Call Forwarding, Call Back, Call Conferencing, Call ID, can be similarly tested and verified for introduction in the communications system.

Figure 1:
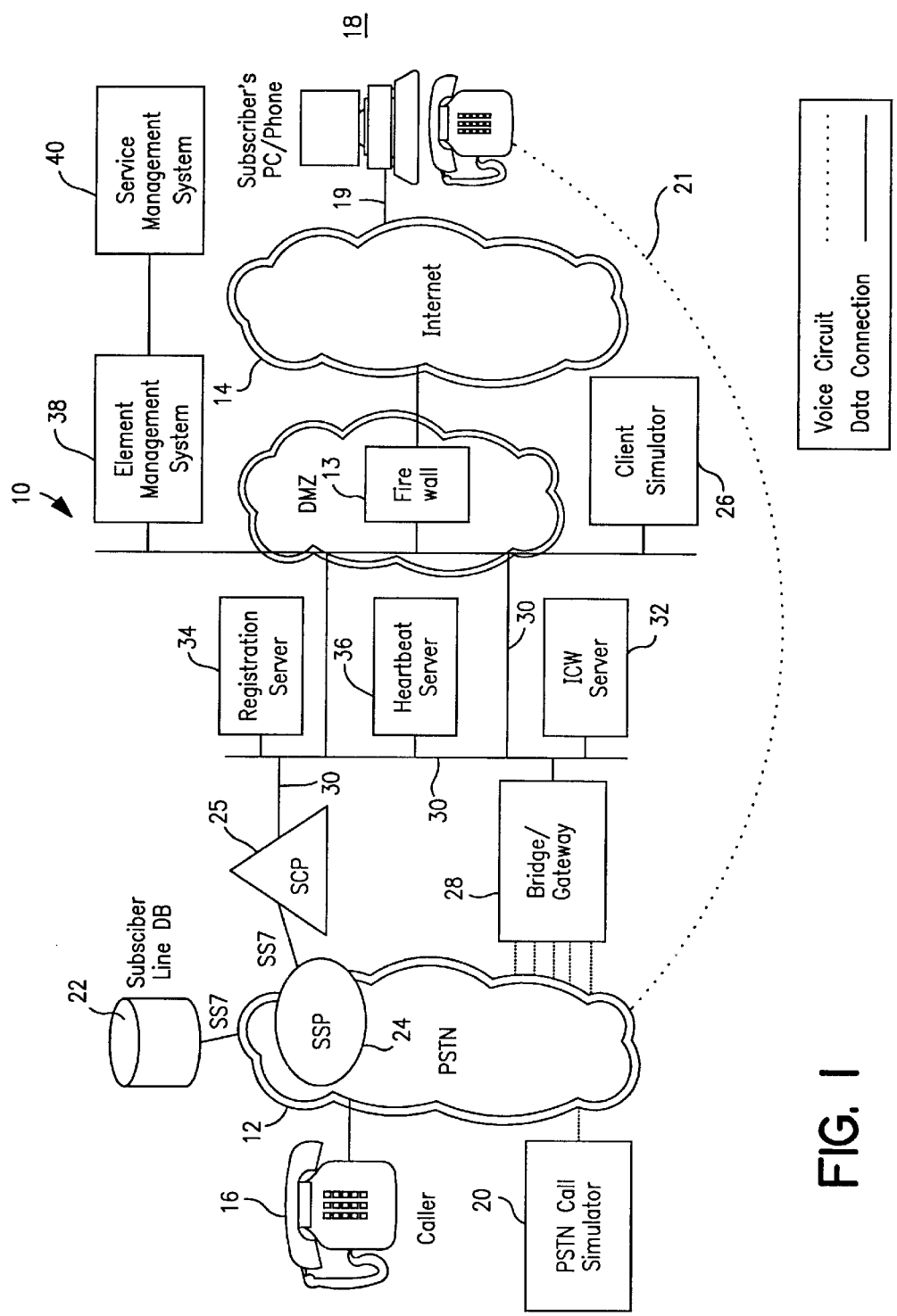
FIG. 1 is a block diagram of a PSTN-to-IP test system including a client simulator for use in testing PSTN-to-IP network telephone services prior to the availability of the telephone service and incorporating the principles of the present invention.

In FIG. 1, a PSTN-to-IP test system 10 is shown including a telephone system 12 and a communications network 14, e.g., the Internet, adapted to simulate telephone service applications between a caller 16 coupled to the network 12 and a client 18 coupled to the internet 14 by voice circuit 19. The client is also connected to the network 12 by a voice circuit 21. The network 12 is voice circuit based and supports a Signaling System 7 (SS7) including a Service Switching Point (SSP) 24 coupled to a PSTN call simulator 20; a subscriber line database 22, and a System Control Point (SCP) 25. The call simulator 20 is responsible for:

1. Generating call load to a client simulator 26 (to be described hereinafter);
2. Understanding call flow state models including call start-up and call termination scenarios such as:
   (i) Call forwarding;
   (ii) Call acceptance (over PSTN or IP networks);
   (iii) Generic announcements ("I'll Call Back");
3. Generate test case data output from post-test processing for accepting load generated by the simulator 26.

The subscriber line database 22 contains telephone numbers and subscriber information for generating call details between the caller 16 and the subscriber's/PC/phone 18. A bridge/gateway 28 serves as interconnection between the network 12 and the network 14 as will be further described hereinafter.

A TCP/IP bus 30 couples the SCP 25, the bridge/gate 28, and the simulator 26 thorough a firewall 13 to the Internet 14. The bus 30 provides a data connection between the networks 12 and 14. An application server 32 is coupled to the bus 30 and provides different types of telephone services for calls placed between the caller 16 and the subscriber 18. As indicated before, the application server 32 may be used for other service testing, e.g., Call Waiting, Call Forwarding, Call Back, Call Conferencing, Caller ID, etc. For purposes of the present description, however, the server 32 will be referred to as an Internet Call Waiting (ICW) server. The ICW server is where multiple instances of an Internet Call Waiting (ICW) application are executed for incoming call to subscriber(s). The ICW application is responsible for taking details of the incoming call and translating the call into the correct format for the client's simulator 26 software process. The ICW application is also responsible for the detection of time out conditions that may exist when the subscriber has not responded to an incoming call. Once the subscriber has responded, the ICW application then translates the response back into a format that the Service Control Point (SCP) 25 can process.

The client simulator 26 accepts the call load generated by the simulator 20 and provides a load to the simulator 20. The simulator 26 is also programmed to a service state model, which relates to subscriber options and actions. The simulator 26 is part of the PSTN-IP service test system that provides the ability to simulate thousands of clients doing testing. The behavior of the simulated clients is based on predetermined telephone ranges. For example, all telephone numbers in the range of 954-555-0000 through 954-555-1000 will always be "active" and always "Accept the Call". By using the predetermined behavior, the test results are easy to verify. Verification during integration tests of single calls and during system load tests with many thousands of calls is predictable. Any deviation from this predetermined behavior is flagged by the PSTN simulator and the client simulator 26 into a test data output log file. Further details on the behavior of clients are described in Ser. No. 09/468, 929, supra.

A registration server 34 coupled to the bus 30 records the ICW client receiving the service. The role of the server 34 is to maintain the current state of the subscriber's usage of the service. More specifically, the server 34 provides a Telco Service Provider (not shown) for the PSTN 12 with the ability to offer subscriber's PSTN-IP telephone services, which are based on the state of the subscriber's usage of the service. While a customer subscribes to a service, such as ICW, the customer's usage of that service is transient in nature. When the subscriber logs into the Internet, the ICW client software registers with the server 34 based on options set by the subscriber at installation time. These options allow manual or automatic registration at start up of the subscriber's PC. As calls arrive at the Service Switching Point (SSP) 24 and the PSTN, the SSP sends a Termination Attempt Trigger (TAT) to the Service Control Points (SCP) 25. The SCP 25 then sends a Query Response (QR) message to the server 34. The server 34 returns a current state of the subscriber as "active" or "inactive" for the ICW service.

A Heart Beat server 36 coupled to the bus 30 receives a heart beat message from the server 34 to record and verify the ICW service between the caller 16 and subscriber 18. The server 36 is made aware of the subscriber's registration by the server 34. From that point on, the server 36 awaits the transmission of the heart beat message from the subscriber's client software. As heart beats arrive from the subscriber's client software, the server 36 keeps track of the status of the subscriber through the heart beat interval and the number of "missed" heart beats. This method is used in case the subscriber's PC has been shut down, powered off, or has experienced a power outage before the client's software has had a chance to send a de-registration message to the registration server 34. The heart beat interval and the number of permissible "missed" heart beats are configured by the Telco service provider at the installation time and may be changed during ongoing operation of the service.

An Element Management System (EMS) 38 is coupled to the bus 30 and provides subscriber data to the registration server 34. The EMS serves the Telco Service Provider's Operation, Administration, Maintenance & Provision (OAM&P) requirements. For OAM&P, the EMS provides graphical status indications of the various PSTN-IP components, such as the registration server, heart beat server, and application server. In addition to status, the EMS provides an alarm application, which is used by Operation & Maintenance personnel for the PSTN-IP system within the production environment.

A Service Management System (SMS) 40 is linked to the EMS 38. The SMS is used by the Telco Service Provider Customer Service Personnel (not shown) as a repository and transaction system for customer service subscriptions. Once a customer has subscribed to a particular application service, such as ICW, the SMS is responsible for the provisioning of the service subscription for the various PSTN and IP network platforms within the Telco Service Provider's domain. In the case of ICW service, the SMS 40 provisions the SSP 24 switches, the SCP 25 and the registration server 34. The interface to the Registration Service is via the EMS. The EMS is then responsible for provisioning appropriate registration servers. By using this method, the EMS provides a single interface to the SMS for multiple registration servers, which decreases the complexity of the SMS communication interface and routing tables. Further details of the test system 10 can be found in the related application, Ser. No. 09/468,929 referred to above.

Figure 2:
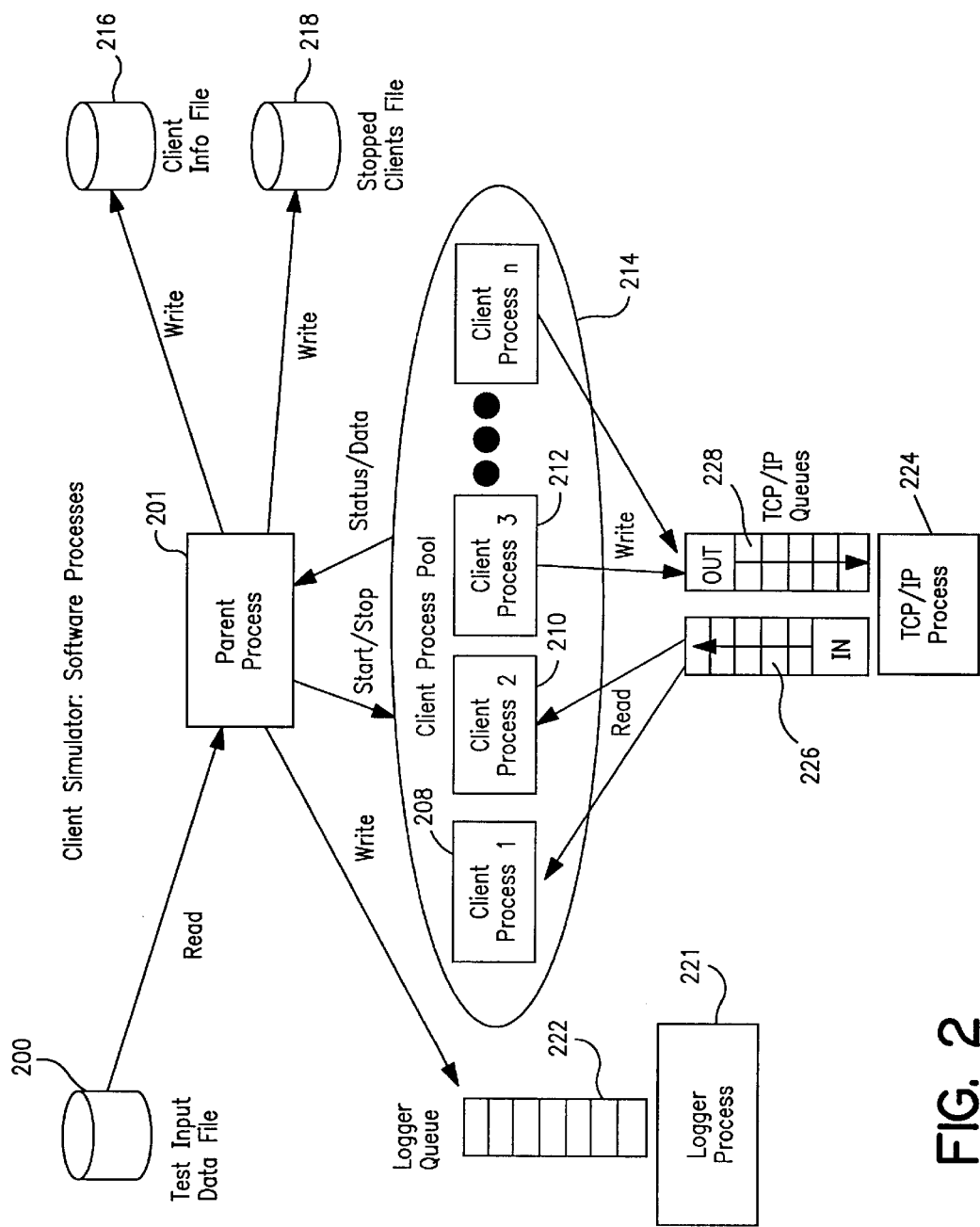
FIG. 2 is a block diagram of software processes and data paths within the client simulator included in FIG. 1.

Now turning to the client's simulator, FIG. 2 discloses the software processes used by the simulator 26 in responding to calls generated by the PSTN Call Simulator 20. The test input data file 200 contains client behavior profiles of either groups or individual client processes to call data messages and provide to the file by the PSTN or the SCP and the application server. The test input file 200 is read by a parent process 201, e.g., Call Waiting, Call Forwarding, Call Back, Call Conferencing, Call ID, etc. The test input data contains the behavior profiles of either groups or individual client processes 208, 210, 212, in a client process pool 214. Examples of data contained in the file 200 are:

(i) Registration Server IP Address and Port Number;
(ii) Heart Beat Server IP Address and Port Number;
(iii) Application Server IP Address and Port Number;
(iv) Default Time Out Values;
(v) Log File Names (for Client Process Data Output); and
(vi) Client Behavior (Accept the Call, Forward the Call, Send a Call to the Caller, etc.).

A Client Information File 216 contains information and data for the total number of client processes that have been identified (within the test input data file 200) as being part of the test. The examples of data contained in the file 200 are:

(i) A Client Process Name (identified as a subscriber phone number);
(ii) Client Process Status ("started" or "stopped"); and
(iii) Data Generated By the Client Process (number of calls handled, errors, etc.).

A Stopped Client File 218 is used to track client processes in the pool 214 that have stopped for any reason during the test. When the parent process 201 desires to communicate with one or all of the client processes, the parent process first checks the stopped client file 218 to determine the status of the client processes. The checking eliminates the overhead of reading and processing the client information file 216 to locate stopped client processes. A log or process 220 is created by the parent process 201 and is responsible to receive all log messages sent by the client processes and write them into a log file in accordance with the current log level. A log or queue 222 allows the parent process 201 to write many event messages to the log or process without having any concerns about processing delays in the log or process. The parent process places event messages on to the log or queue and the log or process reads and processes the log or queue. Examples of Event Data are:

(i) Start (or Stop) Client Process with time stamp; and
(ii) Call Handling such as Accept Call or Forward Call with time stamps.

Telephone Call Messages related to telephone services are originated by the Call Simulator 20 and passed through standard TCP/IP protocol processes 224 to the Client Simulator via an input queue 226 and returned to the Call Simulator via an output queue 228 and the TCP/IP protocol processes 224. Client processes 208, 210 read the input queue after start up by the parent process. The client processes 212, 21n provide status data to the parent process to initiate "start" and "stop" of the client processes.

Figure 3:
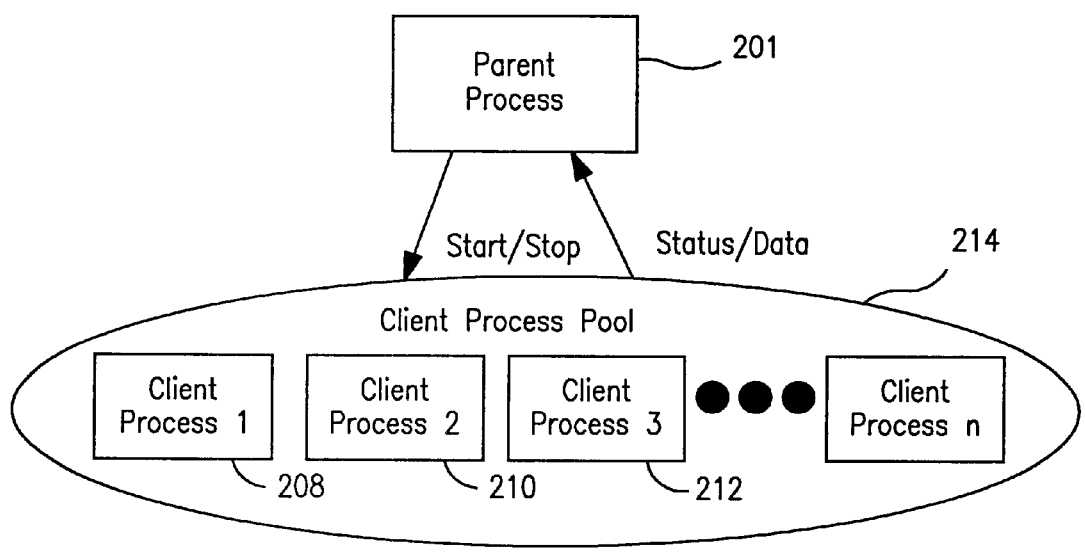
FIG. 3 is a block diagram of a parent process within the client simulator of FIG. 1 in processing test input data containing behavior profiles of either groups or individual client processes in testing PSTN-to-IP network telephone services.

Turning to FIG. 3, the parent process and client processes interaction is shown. The parent process 201 is responsible for: (i) starting/stopping client processes; and (ii) passing the client process behavior obtained from the test data input file 200 to the client process.

The client processes 214 are responsible for returning the following to the parent process:

(i) Process state information (started/stopped);
(ii) Call handling actions (Accepted Call, Forwarded Call, etc.); and
(iii) Call handling statistics (Number of Calls Handled, Errors, etc.).

Figure 4:
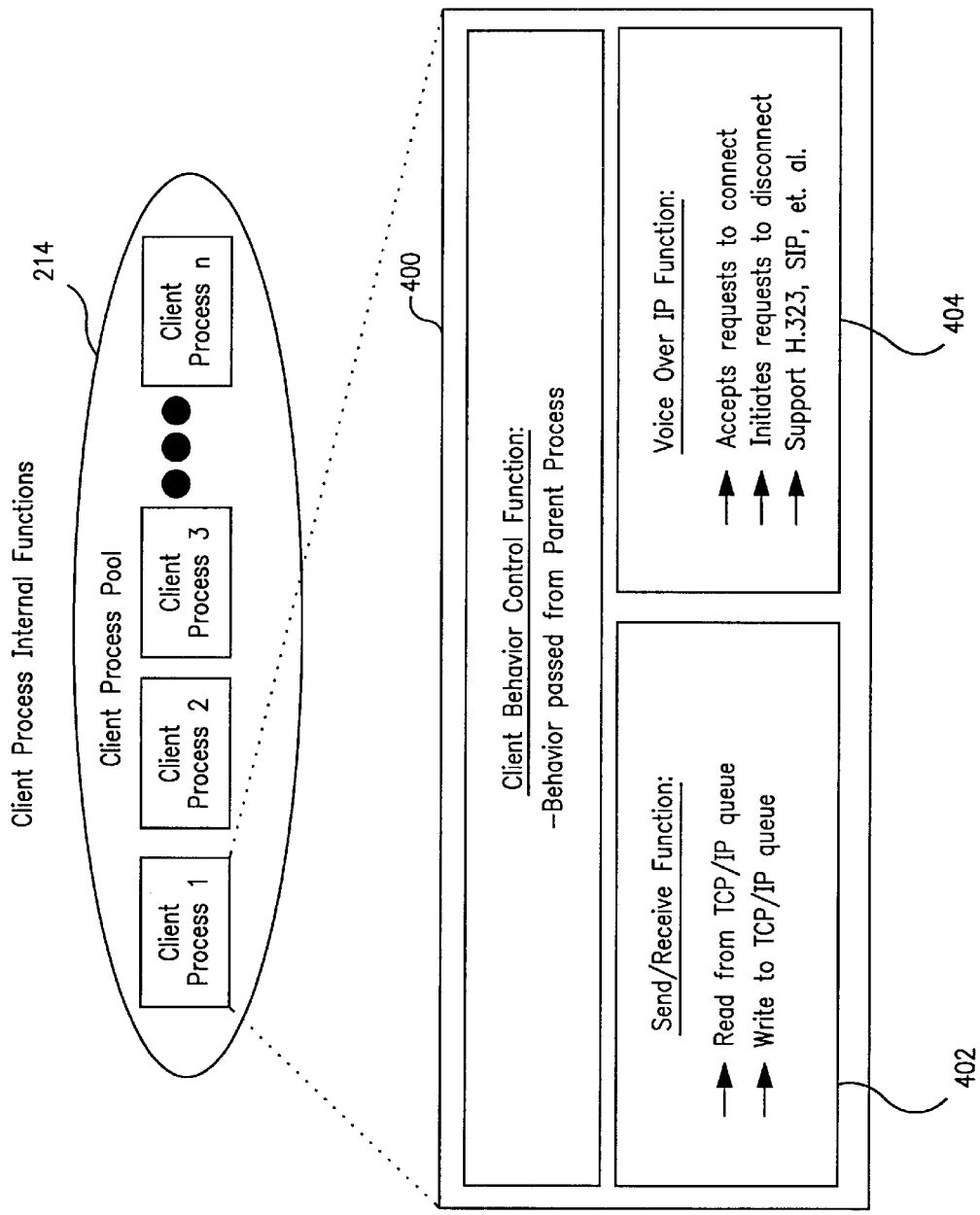
FIG. 4 is a block diagram of the client process running in the client simulator of FIG. 1 including a client behavior control function; a send/receive function, and a voice over IP function in processing test calls.

FIG. 4 shows the internal functions provided by the Client Process Pool 214. A client behavior control function 400 processes and maintains the behavior parameters passed through the parent process by the file 200 and including the following:

(i) Subscriber phone number;
(ii) Registration, Application and Heart Beat Server IP Addresses and Port Numbers;
(iii) Call Handling Behavior (Accepts the call, Forwards the call, etc.);
(iv) Time Out Values; and
(v) Log File Names.

A Send/Receive function 402 is used to read and write to the TCP/IP queue and performs the following functions:

(i) Error Handling;
(ii) Retry Logic; and
(iii) Queue Handling (Initiation, Polling, etc.).

A Voice Over IP function 404 is used when the client process behavior is set to accept the call over the Internet at the subscriber's PC. The Voice Over IP function the following:

(i) Call Request Acceptance;
(ii) Initiation of Call Disconnect; and (iii) Support of the IETF well known Internet Call Set-Up Protocols such as H.323 or Session Initiated Protocols.

Figure 5:
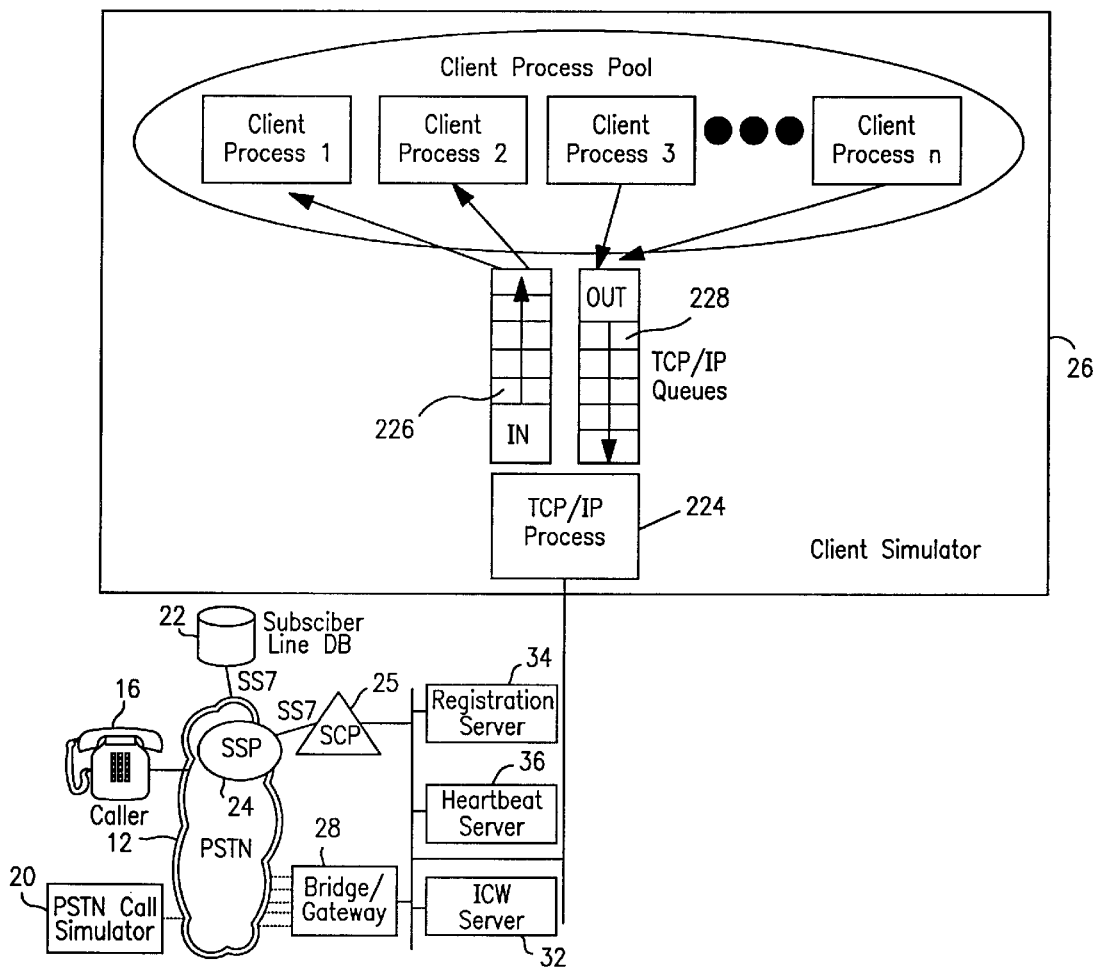
FIG. 5 is a block diagram showing the client simulator interaction with the PSTN-to-IP network during a test call.

In FIG. 5, the Client Simulator 26 interaction with the PSTN-to-IP network will now be described for a test. Once the client processes have been initiated by the parent process (See FIG. 2), incoming calls generated by a single caller on the call simulator 20 are handled by the individual client processes 208, 210, 212. The client processes support a variety of call handling options, as follows:

1. Accept the call on the subscriber's phone. The acceptance causes a disconnect on the subscriber's dial up session with an Internet Service Provider (ISP) and the completion of the call by the PSTN to the subscriber phone.
2. Accept the call over the Internet. The acceptance causes the PSTN to route the call to the bridge gateway 28 (see FIG. 1) which is responsible for converting the call into a Voice Over IP Call using a protocol such as H.323 or a Session Initiated Protocol with the subscriber's PC.
3. Forward the call to another telephone number.
4. Send a voice message to the caller, such as "I'll Call Back" or "Call Me Back Later".
5. Ask the caller to leave a message. The request causes the PSTN to route the call to the bridge/gateway, which is responsible for storing the message.

Figure 6:
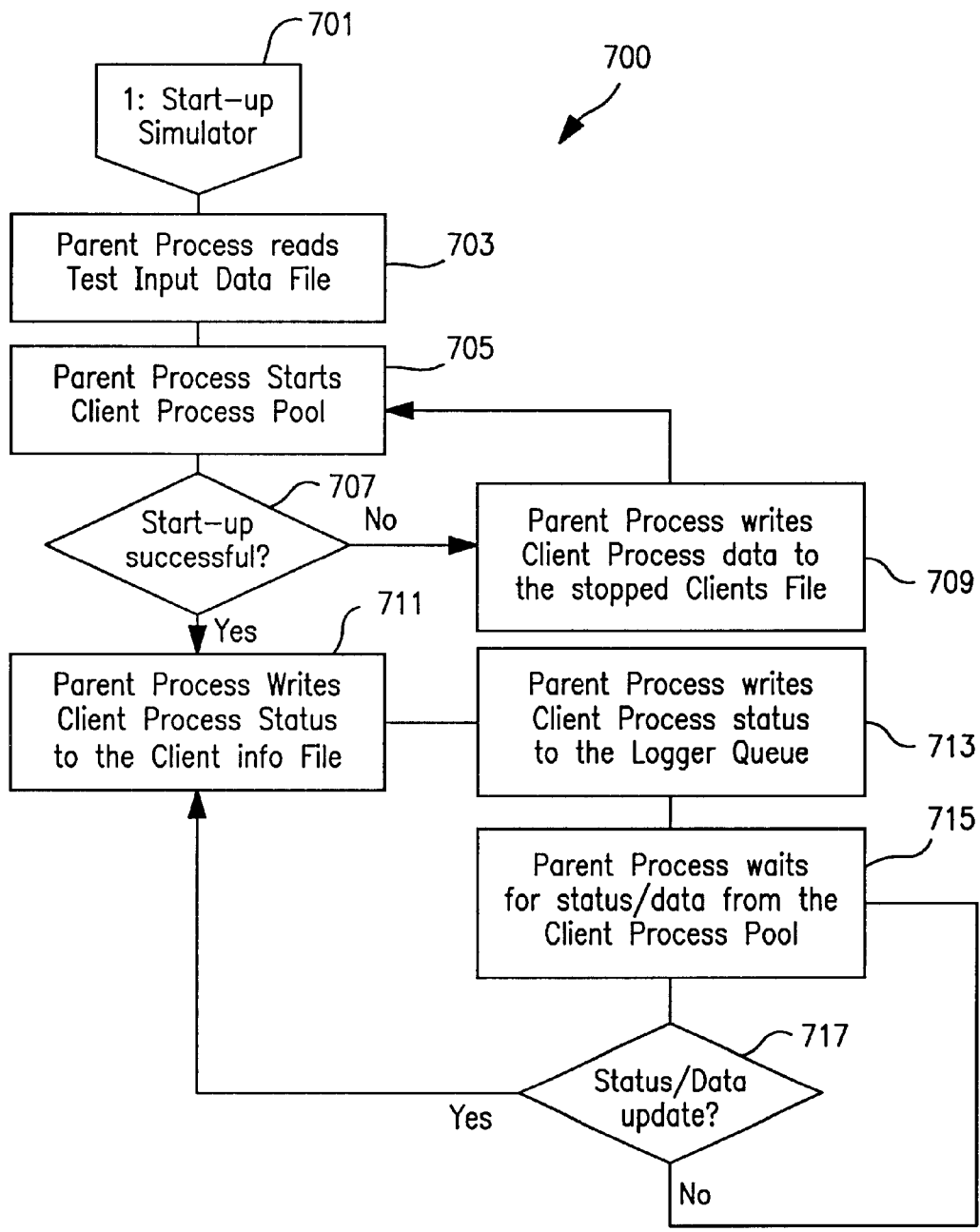
FIG. 6 is a flow diagram for starting the client simulator in FIG. 1.

Now turning to FIG. 6, start up of the simulator 26 will be described in start-up process 700. When a call is received by the simulator 26 from the simulator 20 via the TCP network 30 and entered into the queue 226 (see FIG. 2), simulator 26 is activated in step 701. The parent process 201 reads the test input data file 202 in step 703. Afterwards, the parent process starts the client process pool 214 in step 705. A test 707 is performed to determine whether the simulator's start-up was successful. A "no" condition causes the parent process to write the client process data to the "stop client file" in step 709. A "yes" condition initiates the parent process to write the client process status into the client information file 216 in step 711. In step 713, the parent process writes the client process status to the log or queue. In step 715, the parent process waits for the status/data from the client process pool. A test 717 is performed to determine whether the status/data update has been completed. A "yes" condition initiates the step 711 to write the status/data update into the client information file. A "no" condition for test 717 places the parent process in "hold" waiting for the status data from the client process pool.

Figure 7:
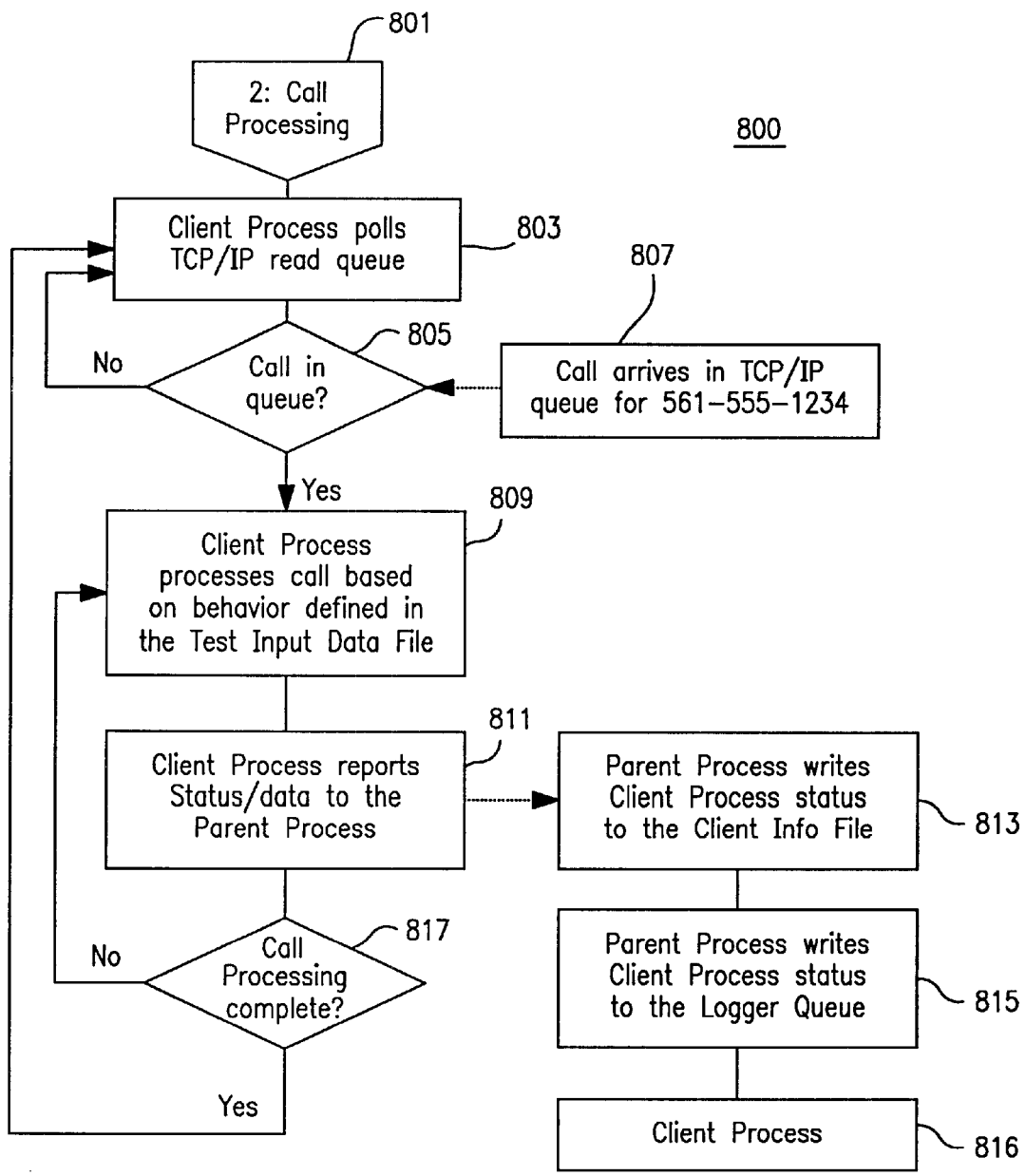
FIG. 7 is a flow diagram of call processing by the client simulator during testing of PSTN-to-IP network telephone services.

FIG. 7 describes a call processing process 800 performed by the client simulator in responding to calls generated by the simulator 20. In step 801, the client simulator having been started is ready for call processing. The client processes poll the TCP/IP read queue 226 in step 803. A test 805 is made by the client process to determine if a call is in the queue 226. A "no" condition returns the process to step 803. A call 807 arrives in the TCP/IP queue for station 561-555-1234 and initiates the "yes" condition for test 805. In step 809, the client processes the call 807 based on the behavior defined in the test input data file and provided to the parent process. The client process reports the status data to the parent process in step 811. In step 813, the parent process writes the client process status to the client information file and to the log or queue in step 815. In step 816, the client process provides the response to the call 807 according to the client behavior profile for the station. The response is provided to the network 230 via the queue 228 and the TCP/IP processes, after which the process ends unless the test 817 indicates that call process is not complete, whereupon process 800 is repeated. The client responses are sent back to SCP through the application server. The SCP directs the PSTN on how to handle the call as described in conjunction with FIG. 6. A test 817 is made to determine if the call processing is complete. A "yes" condition returns the process to step 803 to process the next call in the queue. A "no" condition returns the process to step 809 for processing of the call based on the behavior defined in the test input data file.

While the invention has been described in conjunction with a preferred embodiment, various changes can be made without departing from the spirit and scope of the invention as defined in the appended claims, in which:

We claim:

1. A client simulator for simulating client behavior in groups or individuals to telephone services in a test system for telephone services between subscribers in a PSTN and clients in a distributed information network, including the Internet (IP Network), prior to availability of the telephone services to the subscribers and clients, comprising:

(a) a processor coupled to a data network linked to the PSTN via a System Control Point (SCP) and to the IP Network via an application server;

(b) a storage means coupled to the processor through input/output registers and including stored instruction for a parent process and a plurality of client processes in a client pool: the storage means further including:
    (i) a test input data file contains client behavior profiles of either groups or individual client processes to call data messages and provided to the file by the PSTN via the SCP and the application server;

(c) parent process means reading the test input data file and passing the client process behavior profile to the client processes;

(d) client process pool means including:
    (i) a client behavior control functions which processes and maintains the behavior parameters passed by the parent process; the behavior control function handling call behavior, including accepting the call message, forwarding the call message according to the client behavior profile;

(e) means for originating and passing a test call message to the test input data file by the SCP and application file, the parent processes passing the call message to the client process; and (f) means for sending call data messages responses back to the SCP through the application server; the SCP directing the PSTN on how to handle the message call response.

2. The client simulator of claim 1 further comprising:
(g) a logger queue file which allows the parent process to write event messages indicating start or stopped client processes with time stamp.

3. The client simulator of claim 1 further comprising:
(h) a client information file containing information and data for the total number of processes identified as being part of the test.

4. The client simulator of claim 1 further comprising:
(i) a stopped client file used to track client processes that have stopped.

5. The client simulator of claim 1 further comprising:
(j) the client process pool means further including a send/receive function to read and write to the registers coupled to the data network and supporting voice over IP protocols.

6. The client simulator of claim 1 further comprising:
   (k) client process pool means providing a variety of call handling options including (a) accepting the call on the client's PC; forwarding the call to another number; sending a voice message to the caller.

7. The client simulator of claim 1 further comprising:
   (l) storage means coupling the client pool processes to the data network.

8. The client simulator of claim 1 wherein the client information file contains:
   (i) a client process name (identified as a subscriber phone number);
   (ii) client Process Status ("started" or "stopped"); and
   (iii) data generated by the client process (number of calls handled, errors, etc.).

9. The client simulator of claim 1 wherein the client process pool performs the following functions:
   (i) accept a call on the subscriber's phone;
   (ii) accept the call over the Internet;
   (iii) forward the call to another telephone number;
   (iv) send a voice message to the caller; and
   (v) ask the caller to leave a message.

10. The client simulator of claim 1 further comprising:
    (m) a send/receive function to read and write to the data network and performs the following functions:
    (i) Error Handling;
    (ii) Retry Logic; and
    (iii) Queue Handling (Initiation, Polling, etc.).

11. The client simulator of claim 1 further comprising:
    (n) a voice over IP function to accept the call over the Internet at the subscriber's PC, and perform the following functions:
    (i) call request acceptance;
    (ii) initiation of call disconnect; and
    (iii) support of Internet call set-up protocols.

12. The client simulator of claim 1 further comprising:
    (o) A client behavior control function for maintain behavior parameters passed through the parent process by the test file.

13. The client simulator of claim 12 wherein the client behavior control function contains the following information:
    (i) subscriber phone number;
    (ii) registration, application and heart beat server IP addresses and port numbers;
    (iii) call handling behavior (accepts the call, forwards the call, etc.);
    (iv) time out values; and
    (v) log file names.

14. The client simulator of claim 1 wherein the data network uses TCP/IP protocols.

15. In a test system for testing telephone services between subscribers in a PSTN and clients in a distributed information network, including the Internet (IP Network), prior to availability of the telephone services to the subscribers and clients, the client simulator including a processor coupled to a data network linked to the PSTN via a System Control Point (SCP) and to the IP Network via an application server; a storage means coupled to the processor through input/output registers and including stored instruction for a parent process and a plurality of client processes in a client pool, and a test input data file containing client behavior profiles of either groups or individual client processes to call data messages and provided to the file by the PSTN via the SCP and the application server, a method for simulating client behavior in groups or individuals to the telephone services prior to the availability of the services, comprising the steps of:

(a) reading the test input data file by the parent process and passing the client process behavior profile to the client processes in response to a call data message originated by the PSTN;

(b) executing a client behavior control functions in a client process, (c) providing call behavior, including accepting the call message, forwarding the call message according to the client behavior profile; and (d) providing a call message response back to the SCP through the application server; the SCP directing the PSTN on how to handle the call message response.

16. The method of claim 15 further comprising the step of:
    (e) processing and maintaining the behavior parameters passed by the parent process.

17. The method of claim 15 further comprising the step of:
    (f) providing a variety of call handling options including (a) accepting the call on the client's PC; forwarding the call to another number; sending a voice message to the caller.

18. The method of claim 15 further comprising the step of:
    (g) coupling the client pool processes to the data network.

19. The method of claim 15 further comprising the step of:
    (h) Storing in a client information file a client process name (identified as a subscriber phone number); client process status ("started" or "stopped"); and data generated by the client process (number of calls handled, errors, etc.).

20. The method of claim 15 further comprising the step of:
    (i) performing in the client process pool the following functions:
    (i) accept a call on the subscriber's phone;
    (ii) accept the call over the Internet;
    (iii) forward the call to another telephone number;
    (iv) send a voice message to the caller; and
    (v) ask the caller to leave a message.

21. The method of claim 15 further comprising the step of:
    (j) executing the following functions in a send/receive function:
    (i) Error Handling;
    (ii) Retry Logic; and
    (iii) Queue Handling (Initiation, Polling, etc.).

22. The method of claim 15 further comprising the step of:
    (k) executing a voice over IP function to accept the call over the Internet at the subscriber's PC, and performing the following functions:
    (i) call request acceptance;
    (ii) initiation of call disconnect; and
    (iii) support of Internet call set-up protocols.

23. The method of claim 15 further comprising the step of:
    (l) executing a client behavior control function for maintain behavior parameters passed through the parent process by the test file.

24. The method of claim 23 wherein the client behavior control function contains the following information:
    (i) subscriber phone number;
    (ii) registration, application and heart beat server IP addresses and port numbers;
    (iii) call handling behavior (accepts the call, forwards the call, etc.);
    (iv) time out values; and
    (v) log file names.

* * * * *